US011126404B2

(12) United States Patent
Murray et al.

(10) Patent No.: US 11,126,404 B2
(45) Date of Patent: Sep. 21, 2021

(54) RANDOM NUMBER GENERATOR USING MULTIPLE ENTROPY SOURCES AND A METHOD FOR GENERATING RANDOM NUMBERS

(71) Applicant: NXP B.V., Eindhoven (NL)

(72) Inventors: Bruce Murray, Hamburg (DE); Mario Lamberger, Graz (AT)

(73) Assignee: NXP B.V., Eindhoven (NL)

( * ) Notice: Subject to any disclaimer, the term of this patent is extended or adjusted under 35 U.S.C. 154(b) by 213 days.

(21) Appl. No.: 16/416,417

(22) Filed: May 20, 2019

(65) Prior Publication Data
US 2020/0371752 A1   Nov. 26, 2020

(51) Int. Cl.
*G06F 7/58* (2006.01)
(52) U.S. Cl.
CPC .................................... *G06F 7/588* (2013.01)
(58) Field of Classification Search
CPC ................................................ G06F 7/58–588
See application file for complete search history.

(56) References Cited

U.S. PATENT DOCUMENTS

| 9,383,969 B2 | 7/2016 | Van Der Sluis et al. | |
| 2003/0236803 A1* | 12/2003 | Williams | G06F 7/58 |
| | | | 708/252 |
| 2004/0039762 A1* | 2/2004 | Hars | G06F 7/588 |
| | | | 708/255 |
| 2004/0264233 A1* | 12/2004 | Fukushima | G06F 7/588 |
| | | | 365/145 |
| 2006/0179094 A1* | 8/2006 | Onaya | G06F 7/588 |
| | | | 708/250 |
| 2009/0204657 A1* | 8/2009 | Goettfert | H04L 9/0861 |
| | | | 708/255 |
| 2009/0309646 A1* | 12/2009 | Kobayashi | H01L 27/088 |
| | | | 327/355 |

OTHER PUBLICATIONS

Barker, Elaine et al.; "NIST Special Publication 800-90A Revision 1, Recommendation for Random Number Generation Using Deterministic Random Bit Generators;" Jun. 2015.
Holcomb, Daniel E. et al.; "Power-Up SRAM State as an Identifying Fingerprint and Source of True Random Numbers;" IEEE Transactions on Computers, vol. 58, No. 9, pp. 1198-1210, Sep. 2009.

(Continued)

*Primary Examiner* — Matthew D Sandifer
*Assistant Examiner* — Huy Duong
(74) *Attorney, Agent, or Firm* — Daniel D. Hill

(57) ABSTRACT

A device for providing a random number generator is provided. The device may include a true random number generator, at least one deterministic random number generator, and an exclusive OR logic function. The TRNG has an output and the at least one DRNG has an output. The exclusive OR logic function has a first input coupled to the output of the TRNG and a second input coupled to the output of the at least one DRNG, and an output for providing a random number. The TRNG and the at least one DRNG may include separate and independent entropy sources. A method for generating a random number is also provided.

12 Claims, 3 Drawing Sheets

(56) References Cited

OTHER PUBLICATIONS

Kiamehr, Saman et al.; "Leveraging aging effect to improve SRAM-based true random number generators;" Proceedings of the Conference on Design, Automation & Test in Europe Conference & Exhibition (DATE), Lausanne, Switzerland; Mar. 27-31, 2017.

Killmann, Wolfgang et al.; "AIS 20 / AIS 31, A proposal for functionality classes for random number generators;" Version 2.0; Sep. 18, 2011.

Oscca GM Professional Standard of the People's Republic of China; GM/T 0008-2012; "Cryptography Test Criteria for Security IC;" Issued by the State Encryption Management Bureau; Issue and Implementation Date Nov. 22, 2012.

Turan, Meltem Sönmez et al.; "NIST Special Publication 800-90B: Recommendation for the Entropy Sources Used for Random Bit Generation;" Jan. 2018.

Van Der Leest, Vincent et al.; "Efficient Implementation of True Random Number Generator based on SRAM PUFs;" Conference Paper DOI: 10.1007/978-3-642-28368-0_20; Jan. 2012.

\* cited by examiner

RANDOM NUMBER GENERATOR USING MULTIPLE ENTROPY SOURCES AND A METHOD FOR GENERATING RANDOM NUMBERS

BACKGROUND

Field

This disclosure relates generally to random number generation, and more particularly, to a random number generator using multiple entropy sources and a method for generating random numbers.

Related Art

Random number generation is important for virtually all security systems. There are generally two main types of random number generators, true random number generators and pseudo-random number generators. True random number generators (TRNGs) may use a source of entropy like, for example, thermal noise from integrated circuits or decay of radioactive material to generate a stream of random numbers. One type of pseudo-random number generators, called deterministic random number generators (DRNGs), uses an algorithm to generate random numbers. Some DRNGs also include an entropy source to provide a random seed from which to generate a random number. The seed may include a limited sequence of bit strings. It may be difficult for a DRNG to provide sufficient randomness to support security requirements of a security application.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
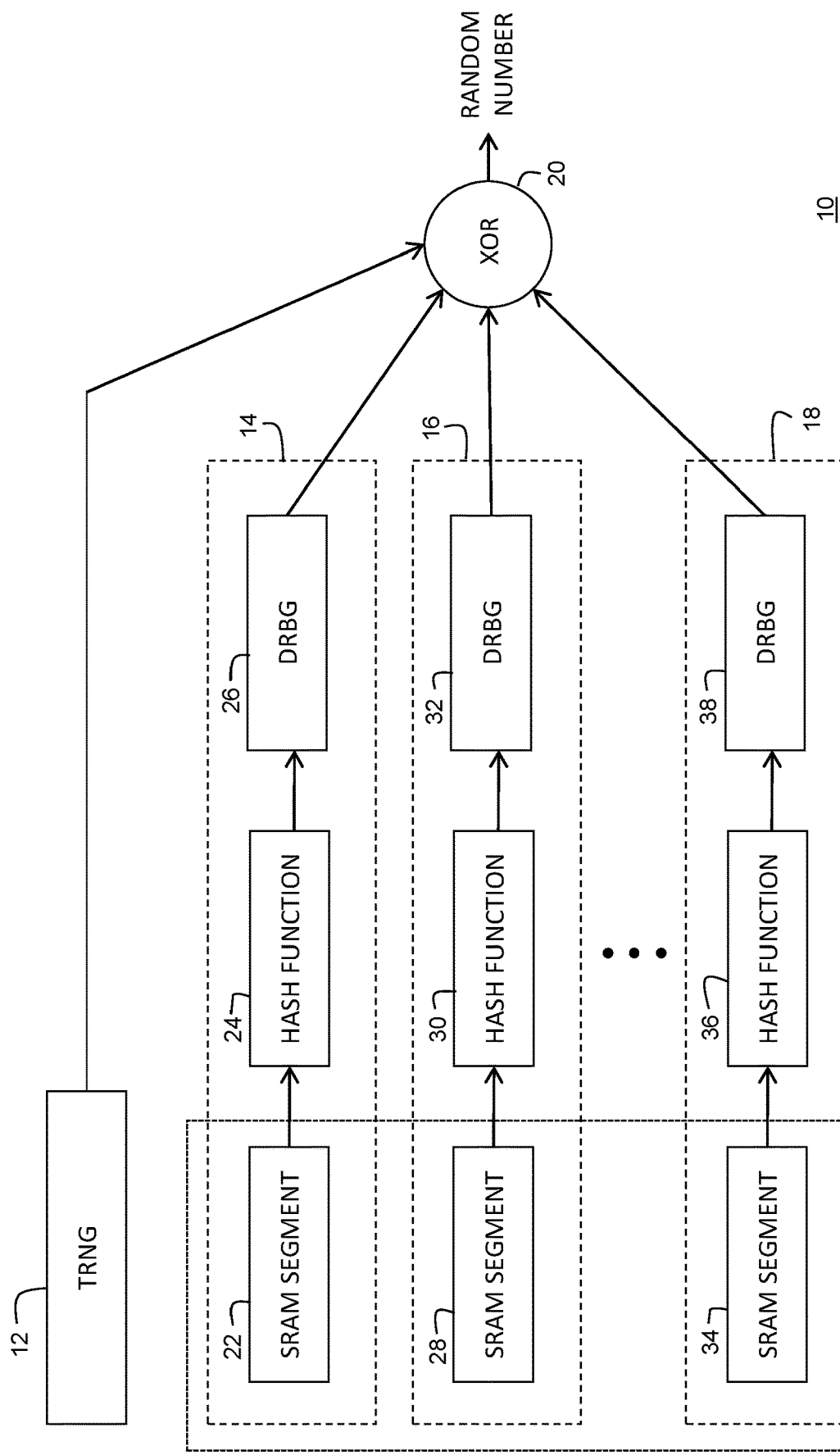
FIG. 1 illustrates a random number generator in accordance with an embodiment.

Generally, there is provided, a random number generator (RNG) that comprises a true random number generator (TRNG) and at least one deterministic random number generator (DRNG). Outputs of the TRNG and the at least one DRNG are coupled to inputs of an exclusive OR logic function. Each of the at least one DRNGs is coupled to receive a seed value from an entropy source that is separate and independent of the entropy sources of the TRNG and any other DRNGs. In one embodiment, a static random-access memory (SRAM) array functions as the entropy sources and provides seed values. For example, in one embodiment, the entropy sources are non-overlapping segments of memory cells of the SRAM array. In another embodiment, the SRAM segments may be from separate arrays. The seed values are generated by the SRAM array on power up. An output of the TRNG and the outputs of each DRNG are coupled to an input of the exclusive OR logic function. In response, the exclusive OR logic function provides a random number.

Generating a random number in the herein described RNG provides several benefits. For example, using multiple entropy sources provides redundancy for security and safety applications. Also, the described RNG provides failure resilience. For example, TRNGs and DRNGs have different failure mechanisms. Failure mechanisms that apply to a streaming TRNG and to a DRNG that harvests entropy from an SRAM initialization are different from each other, resulting in the described RNG being more robust than an RNG that comprises only, for example, multiple TRNG constructions that might have identical failure modes. Also, the described RNG provides prediction resistance because of its hybrid construction. That is, a future state cannot be predicted even if the internal state of the RNG is exposed. In addition, the use of one or more DRNGs with one TRNG places no practical limitation on the time between required initializations because using multiple entropy sources can greatly increase the number of random seeds available for generating random numbers.

In accordance with an embodiment, there is provided, a device including: a true random number generator having an output; a first deterministic random number generator having an output; and an exclusive OR logic function having a first input coupled to the output of the true random number generator and a second input coupled to the output of the deterministic random number generator, and an output for providing a random number. The first deterministic random number generator may include: an entropy source having a plurality of memory cell bits for generating a seed value; a hash function coupled to the entropy source for hashing the seed value; and a deterministic random bit generator for receiving the hashed seed value and for generating a plurality of random bits. The plurality of memory cell bits may include a plurality of static random-access memory cell bits. The device may further include a second deterministic random number generator having an output coupled to a third input of the exclusive OR logic function. Each of the first and second deterministic random number generators may include: an entropy source including a plurality of memory cell bits for generating a seed value; a hash function coupled to the entropy source for hashing the seed value; and a deterministic random bit generator for receiving the hashed seed value and for generating the plurality of random bits. The entropy sources of the first and second deterministic random number generators may be separate non-overlapping segments of bits of a static random-access memory array. An entropy source of the true random number generator may be different than the entropy sources of the first and second deterministic random number generators. The device includes a secure element for use in a smartcard or mobile phone.

In another embodiment, there is provided, a random number generator including: a true random number generator having an output; a plurality of deterministic random number generators, each of the plurality of deterministic random number generators including: an entropy source for generating a seed value; a hash function coupled to the entropy source for hashing the seed value; and a deterministic random bit generator for receiving the hashed seed value and an output; an exclusive OR logic function having a first input coupled to the output of the true random number generator, a plurality of second inputs, each of the plurality of second inputs coupled to a corresponding output of a deterministic random number generator of the plurality of deterministic random number generators, and an output for providing a random number. The entropy source of each of the plurality of deterministic random number generators may include a plurality of static random-access memory cells. The entropy sources of the deterministic random number generators may include separate non-overlapping segments of memory cells from a static random-access memory array. The random number generator may further include a memory for storing the random number output from the exclusive OR logic function. The random number generator may be implemented in a secure element. The random number generator may be implemented using instructions stored on non-transitory machine-readable storage medium.

In yet another embodiment, there is provided, a method for generating a random number, the method including: generating a first plurality of random bits using a true random number generator; extracting a seed value from a first entropy source for a first deterministic random number generator; generating a second plurality of random bits using the first deterministic random number generator; and providing the first and second pluralities of random bits to an exclusive OR logic function, and in response, the exclusive OR logic function outputting the random number. Extracting a seed value from a first entropy source may further include powering up an array of static random-access memory cells, wherein the first entropy source may include a plurality of memory cells of the array. The method of may further include: extracting a seed value from a second entropy source for a second deterministic random number generator; generating a third plurality of random bits using the second deterministic random number generator; and providing the third plurality of random bits to the exclusive OR logic function. The steps of extracting the seed values from the first and second entropy sources may further include extracting the seed values from an array of static random-access memory cells, wherein the first entropy source may include a first plurality of the static random-access memory cells and the second entropy source may include a second plurality of the static random-access memory cells, and wherein the first and second pluralities of static random-access memory cells may be separate and non-overlapping from each other. Extracting the seed values from the array may further include powering up the array. The method may be performed using instructions stored on non-transitory machine-readable storage medium.

FIG. 1 illustrates RNG 10 in accordance with an embodiment. Random number generator 10 includes TRNG 12 and a plurality of DRNGs represented by DRNGs 14, 16, and 18. Random number generator 10 also includes exclusive OR logic function 20 and SRAM array 40. Static random-access memory 40 includes a plurality of SRAM segments including SRAM segments 22, 28, and 34. Each SRAM segment provides an entropy source for a corresponding DRNG. Deterministic RNG 14 includes SRAM segment 22, hash function 24, and deterministic random bit generator (DRBG) 26. Deterministic RNG 16 includes SRAM segment 28, hash function 30, and DRBG 32. Deterministic RNG 18 includes SRAM segment 34, hash function 36, and DRBG 38.

True RNG 12 is a conventional streaming true random number generator that can be implemented in several ways. In one embodiment, TRNG 12 includes an entropy source based on electronic circuit noise. In another embodiment, TRNG 12 may use a different entropy source. Each of SRAM segments 22, 28, and 34 provides a separate and independent entropy source to generate a seed value for a corresponding DRNG. The seed value is extracted from each SRAM segment by extracting inherent randomness of the SRAM startup state. There may be any number of deterministic RNGs in RNG 10, and each of the DRNGs includes its own SRAM segment as a source of entropy.

Static random-access memory array 40 may be a conventional SRAM array including a plurality of memory cells organized in row and columns. A row includes a word line and all the memory cells coupled to the word line. A column includes a bit line pair and all the SRAM cells coupled to the bit line pair. In one embodiment, the SRAM cells may be a conventional six-transistor SRAM cells implemented in a conventional complementary metal oxide semiconductor (CMOS) process. In another embodiment, SRAM array 40 may be different. For example, in another embodiment, SRAM array 40 may be characterized as being a register file.

The operation of RNG 10 may be described as including two operating phases. The first phase may be described as a DRNG initialization phase, where a seed value is extracted from the SRAM segments. The SRAM array includes N−1 pre-defined SRAM segments for N−1 DRNGs, where each SRAM segment includes a plurality of memory cells, and each memory cell powers up into an initial state. The initial states of SRAM segments 22, 28, and 34 are used to determine a seed value. Note that SRAM array 40 must be uninitialized, that is, SRAM array 40 must be powered up and the seed value generated before the array is set to a predetermined state. In one embodiment, SRAM array 40 includes 768 bytes and each segment may include 256 bytes. In another embodiment, the size of the SRAM array and the number of bits in a segment may be different. The seed values from entropy sources 22, 28, and 34, are provided to hash functions 24, 30, and 36, respectively. The hash functions are used to extract randomness from the SRAM segments. For example, SHA-256 is an example of a cryptographic hash function suitable for this purpose. Hash functions 24, 30, and 36 provide a hash output to deterministic random bit generators (DRBGs) 26, 32, and 38, respectively. An example of a suitable DRBG is the CTR-DRBG using AES-128 as the underlying cipher, as standardized by the National Institute of Standards and Technology (NIST) and specified in NIST SP800-90A. The use of a DRBG such as the counter mode CTR-DRBG makes RNG 10 suitable for cryptography. The outputs of DRBGs 14, 16, and 18 are provided to inputs of exclusive OR logic function 20. Exclusive OR logic function 20 then outputs a random number labeled "RANDOM NUMBER."

There are N−1 DRNGs in the illustrated embodiment, where N is the total number RNGs including TRNG 12. The SRAM segments are non-overlapping, meaning that none of the memory cells are shared by multiple segments. Non-overlapping segments are used to ensure mathematical independence of the entropy sources. The entropy relies on "noisy bits" of the array that are present in each segment. Derivation of s bits of initial DRNG context entropy relies on s/(8·B) % noisy bits. The s bits are the number of noisy bits, or entropy bits, per segment. This can be assumed under all operating conditions if s/8·B≈0.05, where B is the number of bytes in a segment. The internal state of each DRNG is c bits (8·c bytes). The state information is referred to as the "context" of the DRNG. Here it is assumed that c<h, where h is the size of the hash output of a hash function. The total context for the N−1 DRNGs thus requires (N−1)·c·8 bytes; this context information is stored in a memory of a secure element (FIG. 2) where RNG 10 is implemented. A secure element is described below in the discussion of FIG. 2.

True RNG 12 does not require initialization and runs automatically when the secure element is powered-on, together with total failure tests and online tests for quality control. The initialization phase of the N-source RNG may be executed by invoking an appropriate firmware call before any customer code or card operating system acts to initialize SRAM content. The firmware call may also cause the extracted bits of the appropriate RAM segments to be hashed, cause the (N−1)·c·8 bytes of DRNG context to be generated as described above, verify that TRNG 12 is operating correctly, and then return control to user mode (in which mode the memory containing the DRNG context is "firewalled out" in the secure element.

After the initialization phase is complete, an access phase begins, where access to the output of RNG 10 may be obtained, e.g., via a relevant firmware call. In one embodiment, as a parameter, the firmware call may specify the number of RNG bytes requested; thereafter, once the call is invoked, a memory map may be switched to enable firmware code to access the DRNG context. The requested bytes may be returned by the firmware in a memory of the secure element (see FIG. 2). The bytes, per access, to be drawn for RNG 10 applies an implementation specific limit determined by the available memory provided for returning random bytes from the RNG access firmware call. Inside the call, the firmware loads each DRNG context in sequence, generates the required number of bytes and XORs them together using XOR 20. Exclusive OR logic function 20 also operates on the required number of bytes drawn from TRNG 12. Exclusive OR logic function 20 has one input connected to the output of TRNG 12 and a plurality of inputs, where each of the plurality of inputs is connected to an output of one of the DRNGs, and an output for providing RANDOM NUMBER. Exclusive OR logic function 20 may be implemented in many different ways, e.g., include a number of exclusive OR logic gates connected together to provide an exclusive OR logic function. Once the result RANDOM NUMBER is loaded into memory, the firmware call returns control to the user code (at which time the RNG context is firewalled out and no longer visible in the memory map).

Figure 2:
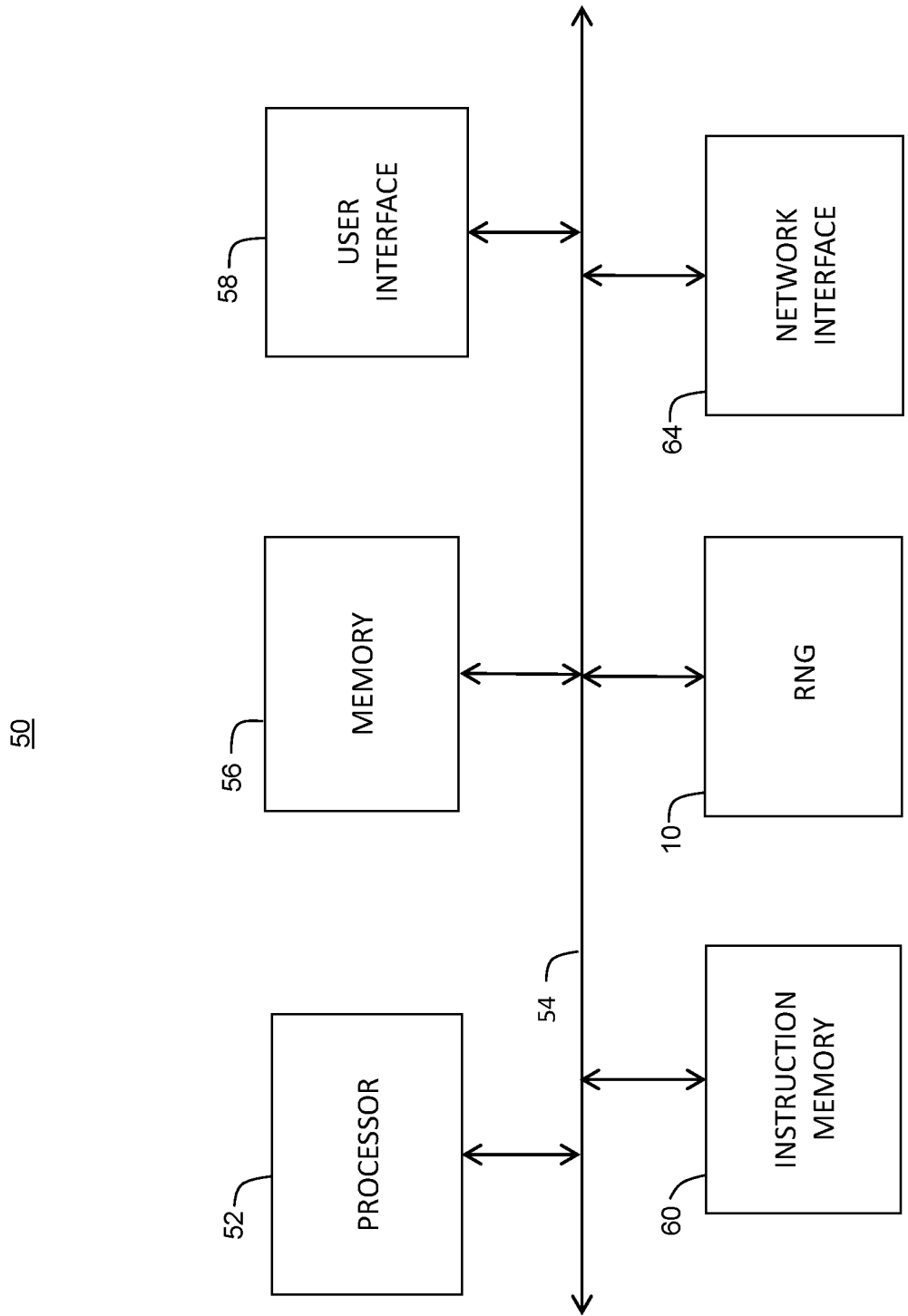
FIG. 2 illustrates a data processing system useful for implementing a secure element having the random number generator of FIG. 1.

FIG. 2 illustrates data processing system 50 useful for implementing a secure element having RNG 10 of FIG. 1. Random number generator 10 may be implemented partially in hardware and partially in firmware on data processing system 50 or a similar data processing system. Data processing system 50 may be implemented on one or more integrated circuits and may be used in an implementation of the described embodiments. Data processing system 50 may be used in applications requiring secure access, such as for example, smartcards or mobile phones. Data processing system 50 includes bus 54. Connected to bus 54 is processor 52, memory 56, user interface 58, instruction memory 60, RNG block 10, and network interface 64. Generally, processor 52 is configured to execute security-sensitive applications. Processor 52 may be any hardware device capable of executing instructions stored in memory 56 or instruction memory 60. For example, processor 52 may execute instructions stored in memory 56 or instruction memory 60 for accessing random numbers from RNG 10. The security-sensitive applications may be encrypted. Processor 52 may have multiple processing cores. Processor 52 may be, for example, a microprocessor, field programmable gate array (FPGA), application-specific integrated circuit (ASIC), or similar device.

Random number generator 10, as described above, can be used to generate random numbers for constructing, for example, one or more asymmetric or symmetric cryptographic keys. The constructed keys may then be used to encrypt the security-sensitive applications and associated data for storage in memory 56. Also, SRAM array 40, described above as providing the entropy sources for RNG 10, may be a dedicated SRAM array associated with RNG 10. In another embodiment, SRAM segments may be provided from another memory such as memory 56 or another volatile memory array.

Memory 56 is considered a secure memory for storing security-sensitive applications and data. Memory 56 may include volatile memory such as static random-access memory (SRAM) or dynamic RAM (DRAM), or may include non-volatile memory such as flash memory, read only memory (ROM), or other volatile or non-volatile memory. Alternately, memory 56 may be a hard drive implemented externally to data processing system 50. In one embodiment, memory 56 is used to store random numbers generated by RNG 10.

User interface 58 may be connected to one or more devices for enabling communication with a user such as an administrator. Network interface 64 may include one or more devices for enabling communication with other hardware devices. For example, network interface 64 may include, or be coupled to, a network interface card (NIC) configured to communicate according to the Ethernet protocol, or with near field communication (NFC). Also, network interface 64 may implement a TCP/IP stack for communication according to the TCP/IP protocols. Various other hardware or configurations for communicating are available.

Instruction memory 60 may include one or more machine-readable storage media for storing instructions for execution by processor 52. In other embodiments, both memories 56 and 60 may also store data upon which processor 52 may operate. Memories 56 and 60 may store instructions for accessing RNG 10 and data related to RNG 10. Memories 56 and 60 may also store, for example, encryption, decryption, and verification applications or data related to the applications.

To improve performance, calls to access RNG 10 may be serviced with an output buffer (not shown). Also, the output size of RNG 10 may be selectable. This means that if, for example, an access call requested x bytes from a total of D bytes, how the remaining D−x bytes of RNG 10 are output is treated is an implementation decision. The remaining bytes may either be discarded, or the remaining bytes can be internally buffered in, e.g., memory 56 in secure element 50. In effect, this can provide a caching mechanism in which requests for small numbers of bytes might be serviceable without invoking the use of a new DRNG context.

Using multiple RNGs together to generate a random number with multiple entropy sources provides redundancy for security and safety applications. Also, RNG 10 provides failure resilience. For example, generally, TRNGs and DRNGs have different failure mechanisms. Failure mechanisms that apply to a streaming TRNG and to harvesting entropy from an SRAM initialization are different, resulting in RNG 10 being more robust than an RNG that comprises only, for example, multiple TRNG constructions that might have identical failure modes. Also, RNG 10 provides prediction resistance because of its hybrid construction. That is, a future state cannot be predicted even if the internal state of RNG 10 is exposed. In addition, using multiple DRNGs with one TRNG places no practical limitation on the time between required initializations because using multiple entropy sources greatly increases the number of random seeds available.

Figure 3:
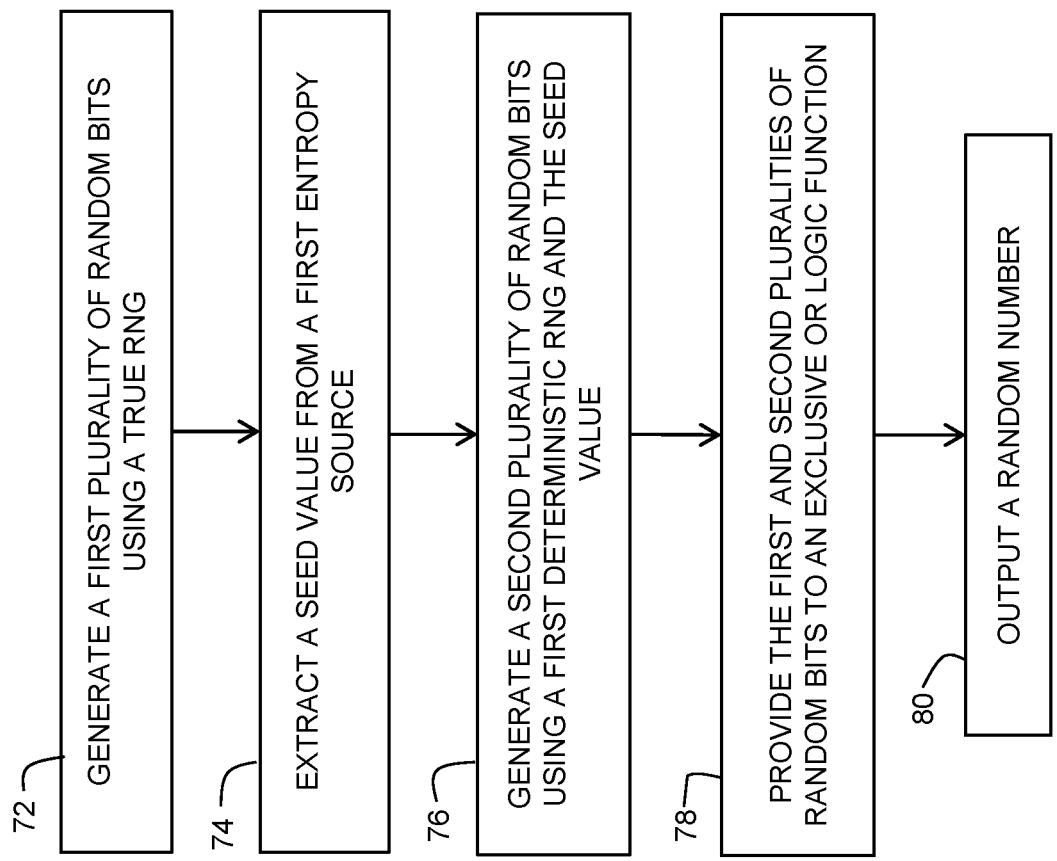
FIG. 3 illustrates a flowchart of a method for generating a random number in accordance with an embodiment.

FIG. 3 illustrates a flowchart of method 70 for generating a random number in accordance with an embodiment. Method 70 starts at step 72. At step 72, a first plurality of random bits is generated using TRNG 12. At step 74, a seed value is extracted from a first entropy source. The entropy source may be one of SRAM segments 22, 28, and 34. At step 76, a second plurality of random bits is generated using a first deterministic RNG and the seed value. For example, SRAM segment 22 may generate the seed value and DRNG 14 may then generate the second plurality of random bits. At step 78, the first and second pluralities of random bits are provided to exclusive OR logic gate 20. At step 80, exclusive OR logic function 20 outputs a random number.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A device comprising:
a static random-access memory (SRAM) having a plurality of segments, wherein each segment of the plurality of segments includes a plurality of SRAM cells, and wherein each SRAM segment of the plurality of segments provides an entropy source and is separate from and non-overlapping with any other segment of the plurality of segments;
a true random number generator having a first entropy source and an output;
a first deterministic random number generator having a second entropy source and an output, wherein the second entropy source is a first segment of the SRAM array;
a second deterministic random number generator having a third entropy source and an output, wherein the third entropy source is a second segment of the SRAM array; wherein the second segment is a different segment from the first segment, and wherein both the second and third entropy sources are different from the first entropy source; and
an exclusive OR logic function having a first input coupled to the output of the true random number generator, a second input coupled to the output of the first deterministic random number generator, a third input coupled to the output of the second deterministic random number generator, and an output for providing a random number.

2. The device of claim 1, wherein the first deterministic random number generator comprises:
the second entropy source for generating a seed value;
a hash function coupled to the second entropy source for hashing the seed value; and
a deterministic random bit generator for receiving the hashed seed value and for generating a plurality of random bits.

3. The device of claim 1, wherein the device is implemented in a secure element.

4. The device of claim 1, wherein the second deterministic random number generator comprises:
the third entropy source for generating a seed value;
a hash function coupled to the third entropy source for hashing the seed value; and
a deterministic random bit generator for receiving the hashed seed value and for generating the plurality of random bits.

5. The device of claim 1, wherein the device comprises a secure element for use in a smartcard or mobile phone.

6. A random number generator comprising:
a static random-access memory (SRAM) having a plurality of segments, wherein each segment of the plurality of segments includes a plurality of memory cells, and wherein each SRAM segment of the plurality of segments provides an entropy source and is separate from and non-overlapping with any other segment of the plurality of segments;
a true random number generator having a first entropy source and an output;
a plurality of deterministic random number generators, each of the plurality of deterministic random number generators comprising:
a second entropy source for generating a seed value, wherein the second entropy source is an SRAM segment of the plurality of segments, and wherein the second entropy source is different from the first entropy source, and wherein the second entropy source is a different SRAM segment for each of the plurality of deterministic random number generators;
a hash function coupled to the second entropy source for hashing the seed value; and
a deterministic random bit generator for receiving the hashed seed value and an output;
an exclusive OR logic function having a first input coupled to the output of the true random number generator, a plurality of second inputs, each of the plurality of second inputs coupled to a corresponding output of a deterministic random number generator of the plurality of deterministic random number generators, and an output for providing a random number.

7. The random number generator of claim 6, further comprising a memory for storing the random number output from the exclusive OR logic function.

8. The random number generator of claim 6, wherein the random number generator is implemented in a secure element.

9. The random number generator of claim 6, wherein the random number generator is implemented using instructions stored on non-transitory machine-readable storage medium.

10. A method for generating a random number, the method comprising:
   providing a plurality of entropy sources using a static random-access memory (SRAM) having a plurality of segments, wherein each segment of the plurality of segments includes a plurality of SRAM cells, and wherein each SRAM segment of the plurality of segments provides an entropy source and is separate from and non-overlapping with any other segment of the plurality of segments;
   generating a first plurality of random bits using a true random number generator, wherein the true random number generator has a first entropy source;
   extracting a first seed value from a second entropy source for a first deterministic random number generator, wherein the second entropy source is a first segment of the plurality of segments;
   extracting a second seed value from a third entropy source for a second deterministic random number generator, wherein the third entropy source is a second segment of the plurality of segments, and wherein the second segment is different from the first segment, and wherein both the second and third entropy sources are different from the first entropy source;
   generating a second plurality of random bits using the first deterministic random number generator;
   generating a third plurality of random bits using the second deterministic random number generator;
   providing the first, second, and third pluralities of random bits to an exclusive OR logic function, and in response, the exclusive OR logic function outputting the random number.

11. The method of claim 10, wherein extracting the first and second seed values from the second and third entropy sources further comprises powering up the plurality of SRAM cells to an initial state, wherein the first entropy source comprises a plurality of memory cells of the array.

12. The method of claim 10, wherein the method is performed using instructions stored on non-transitory machine-readable storage medium.

* * * * *